United States Patent [19]
Lockie

[11] 3,874,221
[45] Apr. 1, 1975

[54] TRANSDUCERS
[75] Inventor: David John Deverill Lockie, Heath End, England
[73] Assignee: The Salartron Electric Group Limited, Hampshire, England
[22] Filed: May 3, 1972
[21] Appl. No.: 249,839

[30] Foreign Application Priority Data
May 5, 1971  United Kingdom .............. 13320/71
May 5, 1971  United Kingdom .............. 13321/71

[52] U.S. Cl.................................. 73/30, 73/32 A
[51] Int. Cl. .......................................... G01n 9/00
[58] Field of Search .............. 73/30, 32 A, 67.2, 70, 73/71.5 US, 194 B, 228

[56] References Cited
UNITED STATES PATENTS

| | | | |
|---|---|---|---|
| 3,175,399 | 3/1965 | Medlar............................. | 73/228 X |
| 3,199,355 | 8/1965 | Simon-Suisse .................... | 73/398 X |
| 3,516,283 | 6/1970 | Abbotts ............................... | 73/30 |
| 3,618,360 | 11/1971 | Curtis ................................. | 73/30 X |
| 3,626,749 | 12/1971 | Abbotts ............................. | 73/30 X |

Primary Examiner—Richard C. Queisser
Assistant Examiner—Stephen A. Kreitman
Attorney, Agent, or Firm—William R. Sherman, Esq.; Stewart F. Moore, Esq.

[57] ABSTRACT

A transducer, e.g., for measuring gas density, comprises a sensing element consisting of a right cylindrical shell, means for maintaining hoop-mode vibrations in the shell and means for producing a signal whose frequency is dependent upon the frequency of these vibrations. At least one end of the shell is open and free to vibrate, so that a circumferential antinode may be formed at this open end. This reduces the range of operating frequencies of the transducer, thereby reducing the error introduced into density measurements by variations of the velocity of sound in the gas or gases whose density is being measured.

7 Claims, 12 Drawing Figures

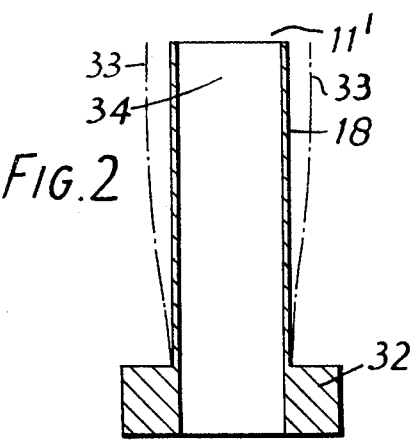
FIG.2
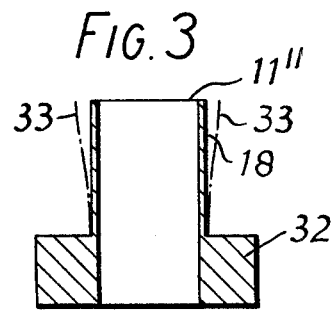
FIG.3
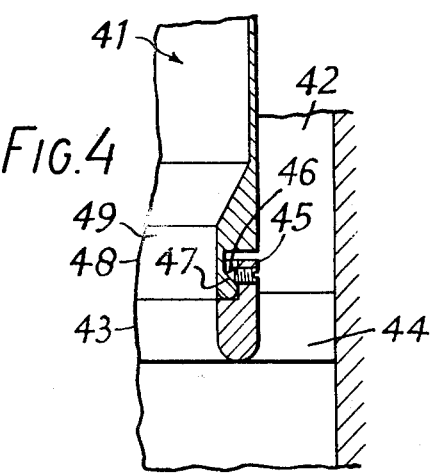
FIG.4
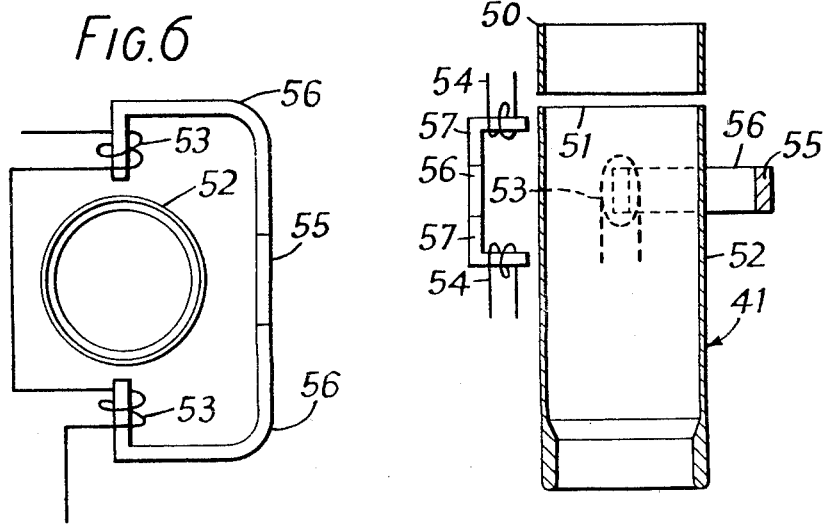
FIG.6
FIG.5

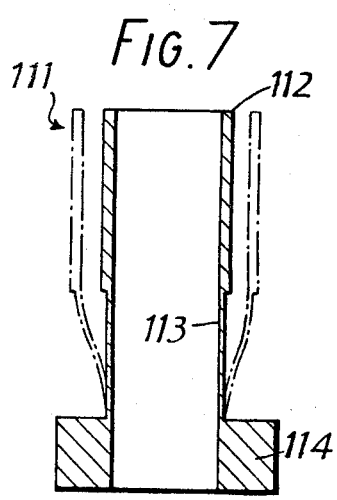
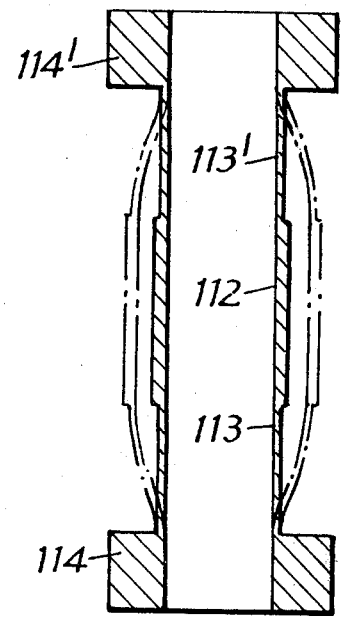
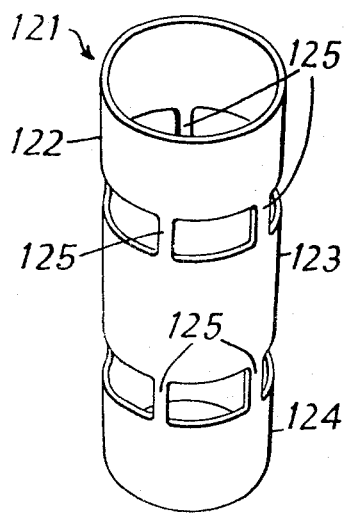
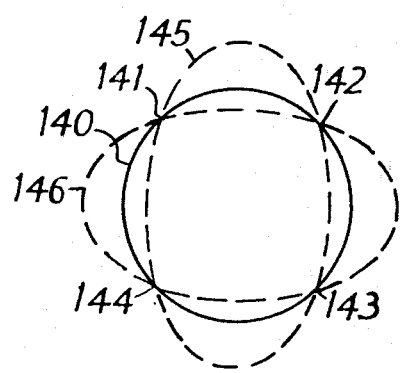

TRANSDUCERS

BACKGROUND OF THE INVENTION

This invention relates to transducers and particularly to transducers having a straight tubular sensing element.

In British patent specification No. 827344 there is described a transducer for use in measuring pressure or pressure difference in fluids. The transducer specifically described therein has a hollow cylindrical sensing element which is closed at one end by a flat wall thicker than the cylindrical wall, and has a thick external flange at the other end. Fluid can be introduced into the space within the sensing element and into a protective casing in which the element is mounted. A difference between the fluid pressures within and outside the sensing element can be measured by observing the frequency of suitably excited hoop mode vibrations of the sensing element. This known transducer can also be used for measuring temperature since, as is pointed out in the British patent specification No. 827344, the frequency falls slightly with increasing temperature owing to the decrease of the modulus of elasticity of the sensing element. An opposite temperature effect can, as is also pointed out in British patent specification No. 827344, be used to compensate for this decrease, the said opposite temperature effect being obtained by hermetically sealing a quantity of gas within the hollow sensing element so that the pressure of the enclosed gas increases with increasing temperature and results in an increase in the resonant frequency of the sensing element with increase in temperature. British Patent Specification No. 1014420 describes a utilization of the latter temperature effect.

In U.S. Pat. No. 3516283 there is described a transducer for use in measuring fluid densities in which a hollow cylindrical sensing element is again used but with an aperture in the flat end wall so that fluid can exert equal pressures on the inside and the outside surfaces of the element.

In a paper entitled "Sound Velocity Effect on Vibrating Cylinder Density Transducers" by P. N. Potter, published by The Solartron Electronic Group Limited, of Farnborough, Hampshire, England, there is described an effect which presents a problem to users of transducers having straight tubular sensing elements. The result of this effect is that the frequency of vibration of such a sensing element when immersed in a fluid not only depends on such factors as the density of the fluid, the magnitude of any pressure differential tending to expand or contract the element, and the temperature of the element, but also depends on the velocity of sound in the particular fluid. Consequently, there is an error whenever a transducer calibrated in, say, nitrogen, is used in another gas or in a mixture of gases, for example natural gas.

The present invention is based upon the realization that this problem can be made less severe by developing transducers in which the sensing elements vibrate at lower frequencies than has hitherto been the case in response to given values of the properties of fluids.

SUMMARY OF THE INVENTION

According to the present invention there is provided a transducer for use in measuring the density or temperature or pressure of a fluid, or a difference in fluid pressure, wherein the transducer has a sensing element which consists of or includes a cylindrical or tubular shell open at at least one end and supported in such a manner that during operation vibration of the shell can be excited which is such that at least part of the said end of the shell vibrates radially relative to the longitudinal axis of the shell, the transducer including means for exciting the said vibration and for sensing the said vibration.

Preferably the said shell is a right circular cylindrical shell. In the case of the shell being a right circular cylindrical shell, the internal diameter of the shell may be larger than the axial length of the shell.

The means for exciting the said vibration may be magnetic if the said shell is of ferromagnetic material, in which case the means for sensing the said vibration is preferably magnetic. A variety of other means for exciting and/or sensing such vibration of a shell are described in U.S. Pat. No. 3,516,283 and co-pending application Ser. No. 853,915, now U.S. Pat. No. 3,618,360.

According to one aspect of the present invention there is provided a transducer for use in measuring the density or temperature of a fluid, wherein the transducer has a straight tubular sensing element, the sensing element has a circumferential node-forming structure at one end thereof and is open at the other end thereof, the wall of the sensing element from the said open end to the node-forming structure is of uniform thickness, and means are provided for exciting and sensing bell-like vibration of the sensing element.

Preferably the wall of the sensing element from the said open end to the node-forming structure defines a right circular cylindrical shell.

Where the sensing element is to be substantially insensitive to temperature variation over a working range, the material of which the sensing element is formed must be chosen accordingly. For example, where the means for exciting and sensing bell-like vibrations of the sensing element are magnetic, the material may be an iron-nickel-chromium alloy known as Ni-span C 902, details of which are given in British Patent Specification No. 1175664 and in Technical Bulletin T.31 of the Huntingdon Alloy Products Division of the International Nickel Company, Inc. of Huntingdon, W. Va., United States of America.

According to another aspect of the invention there is provided a transducer for use in measuring the density or temperature of a fluid, wherein the transducer has a relatively rigid casing and a hollow body within the casing, the said hollow body has a relatively resilient wall spaced from the casing to permit vibration of the said wall, the casing has an inlet through which fluid can be introduced, the arrangement of the hollow body within the casing is such that fluid introduced through the inlet can occupy the interior of the hollow body and the space between the casing and the said wall in such a manner that different fluid pressures on oppoite sides of the said wall are substantially avoided, means are provided for elastically deforming the said wall so as to excite bell-like vibration thereof, and for generating a signal representative of a frequency of the said vibration, the hollow body is tubular, has a circumferential node-forming structure at one end, and is open at the other end thereof, and the said wall is in the form of a tubular shell of uniform thickness extending from the said open end to the node-forming structure. The casing may be provided with an outlet so arranged that fluid can pass from the inlet to the outlet through the hollow body and the space between the casing and the said wall in such a manner that different fluid pressures on opposite sides of the said wall ae substantially avoided.

The said means may or may not be situated within the hollow body or within the space between the casing and the said wall; in other words, the said means may be within the hollow body, or within the said space, or entirely outside the casing.

Other features and advantages of the present invention will be apparent from the following detailed description of a number of preferred embodiments which are illustrated in the accompanying drawings.

BRIEF DESCRIPTION OF THE DRAWINGS

FIG. 2 is a longitudinal sectional view of a second sensing element embodying the invention.

FIG. 3 is an axial sectional view of a third sensing element embodying the invention.

FIG. 4 is a sectional view of part of a transducer according to the present invention.

FIG. 5 is a longitudinal sectional view of a fourth sensing element embodying the invention and provided with means for exciting and for sensing vibration of the element.

FIG. 6 is a view from above of the arrangement of FIG. 5.

FIG. 7 is a longitudinal sectional view of a fifth sensing element in accordance with the present invention.

FIG. 8 is a perspective view of a sixth sensing element of the present invention.

FIG. 9 is a longitudinal sectional view of a seventh sensing element in accordance with the present invention.

FIG. 10 is a diagram illustrating a mode of vibration of a sensing element of the invention.

DESCRIPTION OF PREFERRED EMBODIMENTS

It will be seen from the accompanying drawings that all of the nine embodiments of the sensing element of the present invention possess in common the generic feature of a hollow body having the same cross-section in planes to which one axis of the body is perpendicular and being open at at least one end and supported in such a manner that at least part of the said end of the body can be made to vibrate radially relative to the said axis.

Figure 1:
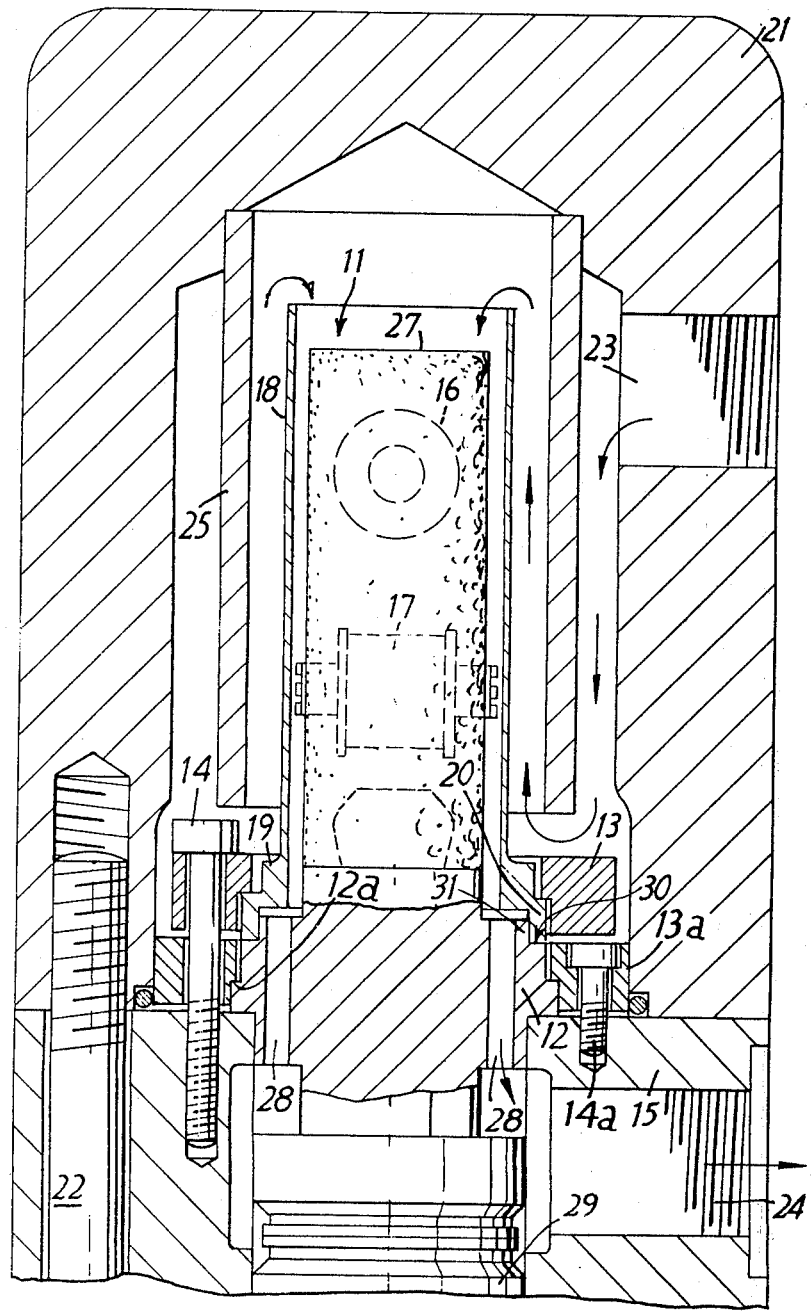
FIG. 1 is a longitudinal sectional view of a fluid density transducer having a first sensing element according to the present invention.

FIG. 1 shows in section part of a transducer for measuring the density of a fuel-gas supply. The transducer includes a cylindrical hollow body 11 secured to a base member 12 by means of a first clamping ring 13 and three bolts, one 14 of which is shown, the bolts being screwed into a base flange 15. The base member 12 is secured to the base flange 15 by means of a second clamping ring 13a, which bears against an annular shoulder 12a formed on the member 12, and three bolts, one 14a of which is shown, these bolts being screwed into the base flange 15. A drive coil 16 and a pick-up coil 17 serve respectively as means for exciting natural vibration of a thin cylindrical wall 18 of the body 11 and means for generating a signal representative of a frequency of the vibration. The coils 16 and 17 are arranged so that their axes are perpendicular to the axis of the body 11 and lie in respective planes which are perpendicular to one another. At the lower end of the body 11 in FIG. 1 the body has a node-forming portion 19 which is a circular external flange or ring of effectively rectangular section integral with the wall 18. The proportions of the wall 18 and the portion 19 are such that the wall is relatively resilient and the node-forming portion 19 relatively rigid. In operation the portion 19 establishes a nodal line encircling the lower end of the wall 18 in FIG. 1.

Another ring or flange integral with the portion 18 is a mounting structure 20. The connection of the mounting structure 20 to the node-forming portion 19 is provided by a small region of "overlap" between the rings constituting these two elements where they become integral with one another. The smallness and material of this connection are such that the connection is elastically flexible and contributes significantly to the attaining of a high Q factor for the hollow body 11. The wall 18, the portion 19, and the structure 20 are coaxial with one another. The material used for the body 11 and the mounting structure 20 is an iron-nickel chromium alloy known commercially as N-span-C 902 (Trade Mark). The clamping ring 13 bears only on the mounting structure 20, so that the node-forming portion 19 is effectively mounted on a circular "hinge" constituted by the connection of the mounting structure 20 to the node-forming portion 19. Clearance is provided between the ring 13 and the portion 19, and between the portion 19 and the base member 12. Clearance is provided between the structure 20 and the larger inner cylindrical surface of the ring 13.

The body 11 and the base member 12 are housed in a casing 21 of aluminum or stainless steel to which the base flange 15 is bolted by eight bolts, part of one 22 of which is shown.

An inlet 23 for gas is provided in the casing 21, and an outlet 24 in the base flange 15. The connections to gas supply lines have been omitted for clarity. The path of gas through the transducer is indicated by arrows from the inlet 23 to the outlet 24. A magnetic shield 25 which is a cylindrical steel tube arranged to be coaxial with the body 11 and secured by being pressed into the casing 21, defines part of the path of the gas. As can be seen from the arrows, the shield ensures that the gas flows first over the outer cylindrical surface of the body 11. The body 11 is open at its upper end in FIG. 1. The gas enters the open end of the body 11 and flows through the body, in so doing passing over a cylindrical mass 27 of epoxy resin embedding the drive coil 16 and the pick-up coil 17 and supporting them on the base member 12, and through eight holes 28 in the base member 12, two of which are shown, to an outlet chamber in the base flange 15. The outlet 24 connects the outlet chamber to a gas pipe (not shown).

The passage of the gas over the outer cylindrical surface of the body 11 and thence to the interior of the body eliminates pressure difference between the exterior and interior of the body 11. Consequently the wall 18 when vibrating is not affected by the pressure of the gas or by pressure differences but only by the density of the gas.

The pick-up coil 17 is connected to the input of an amplifier (not shown) housed in an amplifier casing (not shown) bolted to the base flange 15 by the bolt 22 and its seven companions. The output of the amplifier is connected to the drive coil 16. The phase difference between the output and input signals of the amplifier is arranged to be such that with the coils 16 and 17 disposed as shown natural vibration of the wall 18 can be maintained by feedback through the amplifier regardless of viscous damping. Oscillation at the natural frequency of resonance of the wall when there is viscous damping is ensured by arranging that the driving force applied by the drive coil 16 is proportional to the velocity of the wall 18 sensed by the pick-up coil 17. The direction of the driving force is arranged in accordance with the desired mode of vibration of the wall 18. The amplifier is provided with output amplitude limitation and is of high enough gain to ensure that output limiting occurs under the severest viscous damping to be encountered.

The form of the vibration is similar to that found in bells and is known as the "hoop" or radial mode of vibration. The vibration is initiated by spurious electrical noise occurring when the amplifier is energized.

Electrical leads from the coils 16 and 17 pass through the base member 12 to a plug 29.

In one practical embodiment having a hollow body shaped as shown in FIG. 1, the inside diameter of the wall 18 is 0.709 inches (1.80 cm.), the thickness of the wall is 0.006 inches (0.015 cm.), the outside diameter of the portion 19 is 0.901 inches (2.289 cm.), and the axial length from the upper edge of the wall 18 to the lower edge of the portion 19 (relative to FIG. 1) is 2.110 inches (5.359 cm.). This particular practical embodiment is intended for use in measuring gas densities over a range of 0 to 120 milligrams per cubic centimeter. For a full range of 0 to 60 milligrams per cubic centimeter a wall thickness of 0.003 inches (0.0076 cm.) is preferred. It is found that the Q value for the embodiment covering the 0 to 120 milligrams per cubic centimeter range is at least twice that of a prior art transducer for the same range.

The inside diameter of the mounting structure 20 is equal to the outside diameter of the portion 19. The axial length from the upper edge of the wall 8 to the lower edge of the structure 20 (relative to FIG. 1) is 2.210 inches (5.613 cm.). The axial distance from the lower edge of the structure 20 to its upper edge (relative to FIG. 1) is 0.135 inches (0.343 cm.) so that the axial extent of the "overlap" between the portion 19 and the structure 20 is 0.035 inches (0.0889 cm.). The smaller of the two inner diameters of the clamping ring 13 is 0.915 inches (2.324 cm.) so that a clearance of 0.0047 inches (0.018 cm.) is provided between the ring 13 and the node-forming portion 19. The larger of the two inner diameters of the clamping ring 13 is 1.07 inches (2.72 cm.) and the outside diameter of the mounting structure 20 is 1.04 inches (2.64 cm.) so that a clearance of 0.015 inches (0.038 cm.) is provided between the clamping ring 13 and the mounting structure 20, the ring 13 being held substantially coaxial with the hollow body 11 by means of the three bolts securing the ring 13 to the base member 12. Thus there is no radial contact between on the one hand the clamping ring 13 and on the other hand the node-forming portion 19 and the mounting structure 20, the mounting structure 20 being secured to the base member 12 by solely axially directed clamping forces exerted on the mounting structure 20 by the clamping ring and the base member 12.

In the embodiment having the measurements given above the coils 16 and 16 are so placed that their axes are 0.335 inches (0.851 cm.) from a radial plane at 1.162 inches (2.951 cm.) from the lower edge (relative to FIG. 1) of the ring-shaped mounting structure 20, the coils being on opposite sides of the plane.

The coils 16 and 17 have composite magnetic cores, each core consisting of a short permanent magnet with two longer pole pieces.

By experiment a setting for the coils 16 and 17 is found such that their axes lie along those radii at which the power required when the coils are coupled by an amplifier to excite natural vibration of the wall 18 is at a minimum.

The base member 12 provides a flat reference face 30 against which the lower edge of the mounting structure 20 lies. The positions of the axes of the coils 16 and 17 relative to the cylindrical wall 18 of the body 11 are predetermined by their positioning relative to the face 30 of the base member 12 when the coils are embedded in the mass 27 of the epoxy resin.

The base member 12 is also provided with a circular locating portion 31 on which the ring-shaped mounting structure 20 fits so that the cylindrical wall 18 of the body 11 is coaxial with the cylindrical mass 27 and the locating portion 31.

In the embodiment having the measurements given above, the upper surface of the portion 31 stands 0.07 inches (0.18 cm.) above the face 30, and the lower annular surface of the node-forming portion 19 stands 0.100 inches (0.25 cm.) above the face 30, so that there is a clearance of 0.03 inches (0.08 cm.).

Instead of the drive coil 16 and the pick-up coil 17 being coupled through an amplifier, the drive coil 16 can be driven by a variable frequency oscillator, the pick-up coil 17 then being connected to the input of apparatus suitable for indicating the strength of the signal generated in the pick-up coil by vibration of the resilient wall 18 so that resonance peaks can be detected and the frequency of the oscillator at which the peaks occur recorded.

Other means for exciting vibration include for example mechanisms for striking or bowing the hollow body, loudspeaker types of devices for sonically exciting vibration, and electrostatic means. A signal representative of a frequency of the vibrations can be generated for example by a strain gauge, variable compacitance or inductance sensor, and a photo-electric device in combination with a source of light and means for varying the porportion of light from the source reaching the photo-electric device in dependence upon the predominant frequency of the vibration.

FIG. 2 shows a longitudinal section of another hollow right cylindrical body 11' having a thin cylindrical wall 18 and a node-forming external mounting flange 32 at one end. Chain-dotted lines 33 illustrate the outermost positions of those portions of the wall 18 which are shown in section in FIG. 2 when the wall 18 is undergoing vibration. Hence it will be seen that at the free mouth 34 of the body 11' there are antinodes in the mode of vibration shown.

FIG. 3 shows a longitudinal section of a third hollow right cylindrical body 11" similar to that of FIG. 2 but for which the internal diameter of the thin cylindrical wall 18 is about three-quarters of the axial length of the wall 18.

FIG. 4 shows part of the mounting arrangement of a liquid density transducer in which a hollow right cylindrical body 41 is mounted coaxially within a cylindrical pipe 42 by means of a mounting ring 43 and radial fins, one 44 being shown. The radial fins are fixed to the interior of the pipe 42 and hold the ring 43 coaxially therein. The ring 43 has an annular rim 45 in which grub screws, one 46 being shown, are screw threaded and arranged to bear on a frusto-conical surface 47 formed on an annular lip of a rim 48 formed at one end of the body 41. The rim 48 is formed integrally with a thick, node-forming portion 49 of the body 41.

The portion 49 and the ring 43 are to some extent streamlined for liquid flowing in the axial direction relative to the body 41.

To reduce the possibility of damage to the free mouth 51 of the body 41, a guard ring 50, shown in FIG. 5, is mounted adjacent the free mouth 51 of the body 41 with its axis co-linear with the axis of the body 41, the guard ring 50 having its internal and external diameters substantially equal to the internal and external diameters, respectively, of the thin right cylindrical wall 52 of the body 41. For simplicity the details of the portion 49 of the body 41 and the mounting ring 43 have been omitted.

FIGS. 5 and 6 show an arrangement of drive coils 53 and pick-up coils 54 for use in maintaining a preferred mode of hoop vibration of the wall 52 of the body 41.

The drive coils 53 are mounted on respective pole pieces 56 of a permanent magnet 55 which provides a biasing magnetic field for the drive coils 53 which, in operation, are supplied with an alternating current from an amplifier (not shown) the input stage of which is coupled to the pick-up coils 54 so that the current supplied to the drive coils 53 is an amplifier version of current induced in the pick-up coils 54 by movement of the wall 52 adjacent the coils 54. The pick-up coils 54 are mounted on respective L-shaped pole pieces 57 of another permanent magnet 56 which provides a magnetic flux to be varied by movement of the wall 52 adjacent the free ends of the pole pieces 57.

It is arranged that there is substantially no transformer coupling between the drive coils 53 on the one hand and the pick-up coils 54 on the other hand. The drive coils 53 are so connected to one another that the respective magnetic fluxes in the pole pieces 56 strengthen and weaken in phase.

Transducers according to the present invention can be constructed to have unusable resonance frequency ranges which are at least partially lower than those obtained for the same range of fluid density with the known gas density transducer as described in an article entitled "Frequency Domain Transducers and their Applications" in Instrument Practice, Vol. 23, No. 12, December 1969, pages 849 to 853, by P. N. Potter. This is advantageous in some applications, for example the measurement of densities of liquids, and the measurement of densities of gas mixtures of variable composition in which the velocity of sound varies appreciably with the composition of the gas mixture (see the aforementioned paper entitled "Sound Velocity Effect on Vibrating Cylinder Density Transducers" by P. N. Potter, published by The Solartron Electronic Group Limited, of Farnborough, England.

In FIG. 7 there is shown a sensing element which consists of a first open-ended right circular cylindrical shell 112, a second open-ended right circular cylindrical shell 113, and a mounting flange 114, the two shells 112 and 113 and the flange 114 being integrally formed in the same material.

Both of the shells 112 and 113 have uniform wall thickness but the wall thickness of the shell 113 is sufficiently smaller than that of the shell 112 for the shell 113 to appear substantially flexible to the shell 112. An extreme position of the sectioned portions of the shells 112 and 113 during radial vibration is shown in chain-dotted outline.

In FIG. 8 there is shown a sensing element 121 which consists of three open-ended right circular cylindrical shells 122, 123 and 124 and a plurality of interconnecting members 125, the three shells 122, 123 and 124 and the members 125 being integrally formed from a single open-ended right circular cylindrical shell by the removal of rectangular portions thereof. It is arranged either that the dimensions of the member 125 are such that the stiffness of the members 125 is so small as to have substantially no effect on the shell 123 when that shell is undergoing radial vibration, or that the members 125 connect to the shell 123 at portions thereof which are at nodes in the chosen mode of radial vibration of the shell 123 in operation. When the dimensions of the members 125 are to be as aforesaid, it may be desirable to reduce their thickness from the thickness of the said single shell from which the element 121 is formed.

The shells 122 and 124 serve as mounting means.

In another embodiment the sensing element is as shown in FIG. 8 except that there are only two shells connected together by interconnecting members as though, for example, the shell 124 and the members 125 connecting it to the shell 123 had been cut off. A similar embodiment can be formed by perforating the thin shell 113 of the sensing element shown in FIG. 7.

In FIG. 9 there is shown a sensing element 131 similar to that of FIG. 7 except that instead of there being only one thin shell 113 and one mounting flange 114 there are two thin shells 113 and 113' and two mounting flanges 114 and 114' so that this sensing element 131 resembles that of FIG. 8 in having both ends of the central shell 112 attached to mounting means by flexible interconnecting members. An extreme position of the sectioned portions of the shells 112, 113 and 113' during radial vibration of the shell 112 is shown in chain-dotted outline.

FIG. 10 shows schematically a cross-sectional view of a cylindrical shell 140 in one mode of radial vibration of which the shells 112 and 123 of FIGS. 7, 8 and 9 are capable. This mode is known as mode 2. There are four nodal points 141, 142, 143 and 144 around the circumference of the shell 140. Between each pair of nodal points the shell 140 vibrates, there being an antinode midway between each pair of nodal points. Thus the cylindrical shell 140 oscillates between two extreme states in which it is of elliptical cross-section, the corresponding elliptical outlines being shown in broken lines 145 and 146 in FIG. 10. The major axes of the elliptical outlines are perpendicular to one another.

Since both ends of each of the shells 112 and 123 of FIGS. 7, 8 and 9 are effectively free, i.e., unconstrained, each of these shells is able in operation to oscillate between the two extreme elliptical forms shown in FIG. 10 over its whole length.

Higher modes are possible in which there are more than four nodal points around the circumference of the vibrating shell. In such higher modes the shell may, in addition to having circumference nodes, also have longitudinal nodes in the form of one or more nodal rings encircling the shell at a point along its length.

The circumferential nodal points referred to above in fact are points on nodal lines running along the length of the shell parallel to its axis. Hence, where it is desired that the shell be constrained to vibrate with a given number of such longitudinal nodal lines, it is preferable to use a sensing element such as that shown in FIG. 8 where the interconnecting members 125 can be sufficiently stiff to define nodal circumferential points at the ends of the shell 123, thereby predisposing the shell 123 to vibrate in a mode having nodal lines alinged with the axes of aligned members 125 at the ends of the shell 123.

Where it is desired that the sensing element of a transducer embodying the invention should in operation vibrate in a mode in which there is a nodal ring midway between the ends of a radially vibrating cylindrical shell, the sensing element can be in the form of a single cylindrical shell and can be supported solely by the ball ends of three or more (preferably four) ball-ended screws bearing on the cylindrical shell at equally spaced points on the circumferential line at which the nodal ring is to be formed, the screws being screw-threadedly engaged in a supporting structure with the axes disposed radially with respect to the cylindrical shell. Other means may be used to support the shell at the position of the desired nodal ring.

Where a sensing element of a transducer embodying the invention is in the form of a single cylindrical shell, and a mounting arrangement similar to that of FIG. 8 is desired, but occupying a shorter length, radially disposed struts, spokes or tension wires may be secured to the points at the ends of the shell at which nodal lines are to terminate, the outer ends of such struts, spokes or tension wires being secured to a rigid supporting structure.

The sensing elements described hereinbefore with reference to FIGS. 7 and 8 are particularly suitable for use in transducers for measuring the density of fluids. Preferably the sensing elements of such transducers are of some material which is substantially unaffected by the variation in temperature expected to be encountered in working conditions. For example, the sensing elements may be of Ni-Span C 902, which is an iron-nickel-chromium alloy produced by the Huntingdon Alloy Products Division of the International Nickel Company, Inc. of Huntington, W. Va., Unites States of America. Details of the composition of Ni-Span C 902 are given in British patent specification No. 1175664 and in Technical Bulletin T-31 of the Huntingdon Alloy Products Division.

Various magnetic means of exciting radial vibration of cylindrical shells of ferromagnetic material are described in British patent specification No. 1175664, together with various other means of exciting radial vibrations in cylindrical shells of non-magnetic material.

The sensing element described hereinbefore with reference to FIG. 9 is particularly suitable for use in measuring fluid pressure or differences between fluid pressures since fluid at one pressure can be applied to the interior of the shells 112, 113 and 113', and fluid at another pressure can be applied to the exterior of the shells 112, 113 and 113'. This same sensing element can, however, if the wall of the shell 112 is thick enough, be used in a fluid density transducer substantially as described with reference to FIG. 4 of British patent specification No. 1175664.

Preferably the means for exciting and sensing radial vibration of the tubular or cylindrical shell of a sensing element of a transducer according to the present invention is arranged to be out of the path of fluid entering the transducer in operation.

Figure 11:
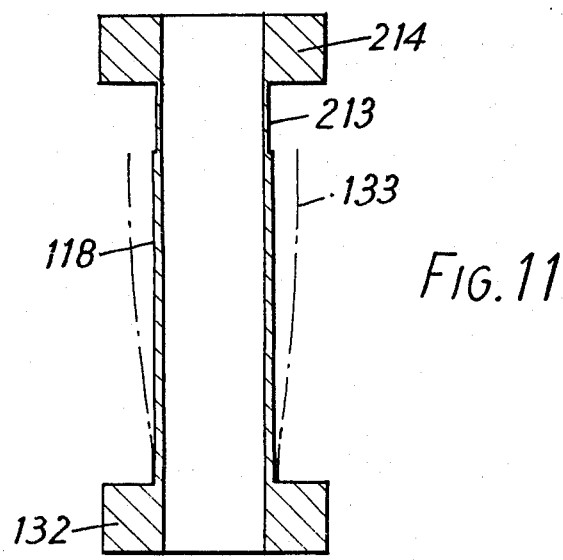
FIG. 11 is a longitudinal sectional view of an eighth sensing element of the invention.

FIG. 11 shows a sensing element which combines features of the elements of FIGS. 2 and 9. A right circular cylindrical shell 118 is formed integral with a node-forming external mounting flange 132 at one end, a thinner walled right cylindrical shell 213 at the other end, and another mounting flange 214 at the remote end of the thin shell 213. Chain-dotted lines 133 illustrate the outermost positions of those portions of the shell 118 which are shown in section in FIG. 11 when the shell 118 is undergoing vibration. It will be seen that the end of the said other shell 118 which is connected to the thin shell 213 vibrates freely, antinodes being formed there in the mode of vibration illustrated.

Figure 12:
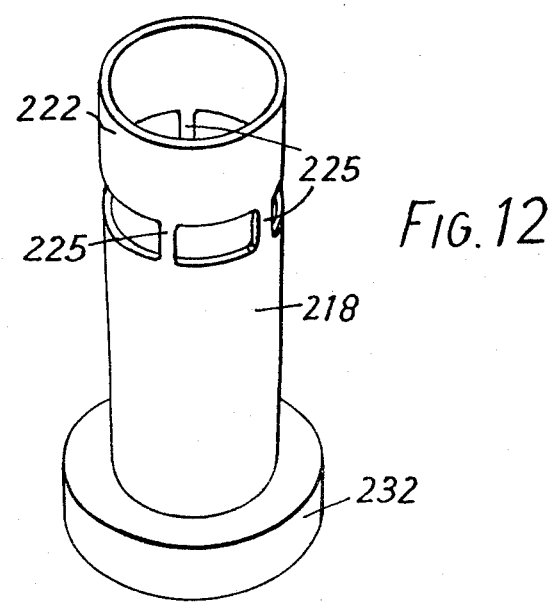
FIG. 12 is a perspective view of a ninth sensing element of the invention.

FIG. 12 shows a sensing element which combines features of the elements of FIGS. 2 and 8. A right circular cylindrical shell 218 is formed integral with a node-forming external mounting flange 232 at one end, a plurality of interconnecting members 225 at the other end and a right circular cylindrical shell 222 at the ends of the members 225 remote from the said other end of the shell 218. The members 225 are formed and dimensioned in the same way as the members 125 of FIG. 8. The shell 222 serves as a mounting means.

I claim:

1. A transducer for use in measuring a physical property of a fluid, the transducer comprising:
    a substantially rigid casing;
    a tubular hollow body disposed within said casing, said body being open at one end and having a tubular resilient wall of uniform thickness spaced from the casing to permit vibration of said wall;
    means for defining an inlet in said casing for permitting entry of fluid into said casing;
    means for elastically deforming said wall to excite bell-like vibration thereof;
    means for providing a signal representative of a frequency of the said vibration; and
    circumferential node-forming means at the other end of said body,
    said tubular wall of uniform thickness extending from said open end to said node-forming means.

2. A transducer according to claim 1, wherein said casing is provided with means defining an outlet for fluid, the outlet means being so arranged that fluid can pass from the inlet means to the outlet means though the hollow body and the space between the casing and the said wall without compressing or expanding the said body.

3. An improved transducer for use in measuring the density of a gas, the transducer comprising:
    a rigid casing;
    means in said casing for defining a gas inlet and a gas outlet;
    a sensing element comprising a right circular cylindrical tubular portion open at one end thereof;

a circumferential node-forming structure at the other end of said element; means for securing said node-forming structure to said casing with said tubular portion of said sensing element spaced from the interior surface of the casing;

means defining a flow path for gas between the gas inlet and the gas outlet whereby the interior and the exterior surfaces of the said tubular portion are equally exposed to gas;

electromagnetic means mounted within said tubular portion for exciting and sensing hoop-mode vibration of said tubular portion, the sensing element being formed of ferromagnetic material;

means for supplying electrical power to the said vibration exciting means; and means for coupling signals generated in the said vibration sensing means to output terminals;

and wherein the improvement is that said tubular portion is of uniform wall thickness from said node-forming structure to said open end, whereby the sensing element is adapted to vibrate in the hoop-mode in which antinodes are present at the said open end.

4. A transducer for measuring a physical property of a fluid, the transducer comprising a casing having an inlet and an outlet for fluid;

a hollow cylindrical body open at at least one end thereof and substantially uniform in wall thickness throughout its axial length, whereby an antinode of vibration may be established at said one end;

means for mounting the cylindrical body for vibration within the casing, means for exciting hoop mode vibration of said cylindrical body;

and means for sensing the frequency of said vibration.

5. A transducer according to claim 4, wherein said cylindrical body is open at both ends thereof;

and wherein said means for mounting is arranged to permit the establishment of respective antinodes of said vibration of both of said ends.

6. A transducer according to claim 5 wherein said means for mounting includes a flexible interconnecting member extending between said casing and each end of said body to support said body and permit free vibration thereof.

7. A transducer according to claim 4 wherein said means for mounting comprises at least one flexible interconnecting member extending between an end of said body and said casing to support said body and permit free vibration thereof.

* * * * *